S. CRAIG.
RESILIENT WHEEL.
APPLICATION FILED DEC. 6, 1913.
1,098,782.
Patented June 2, 1914.
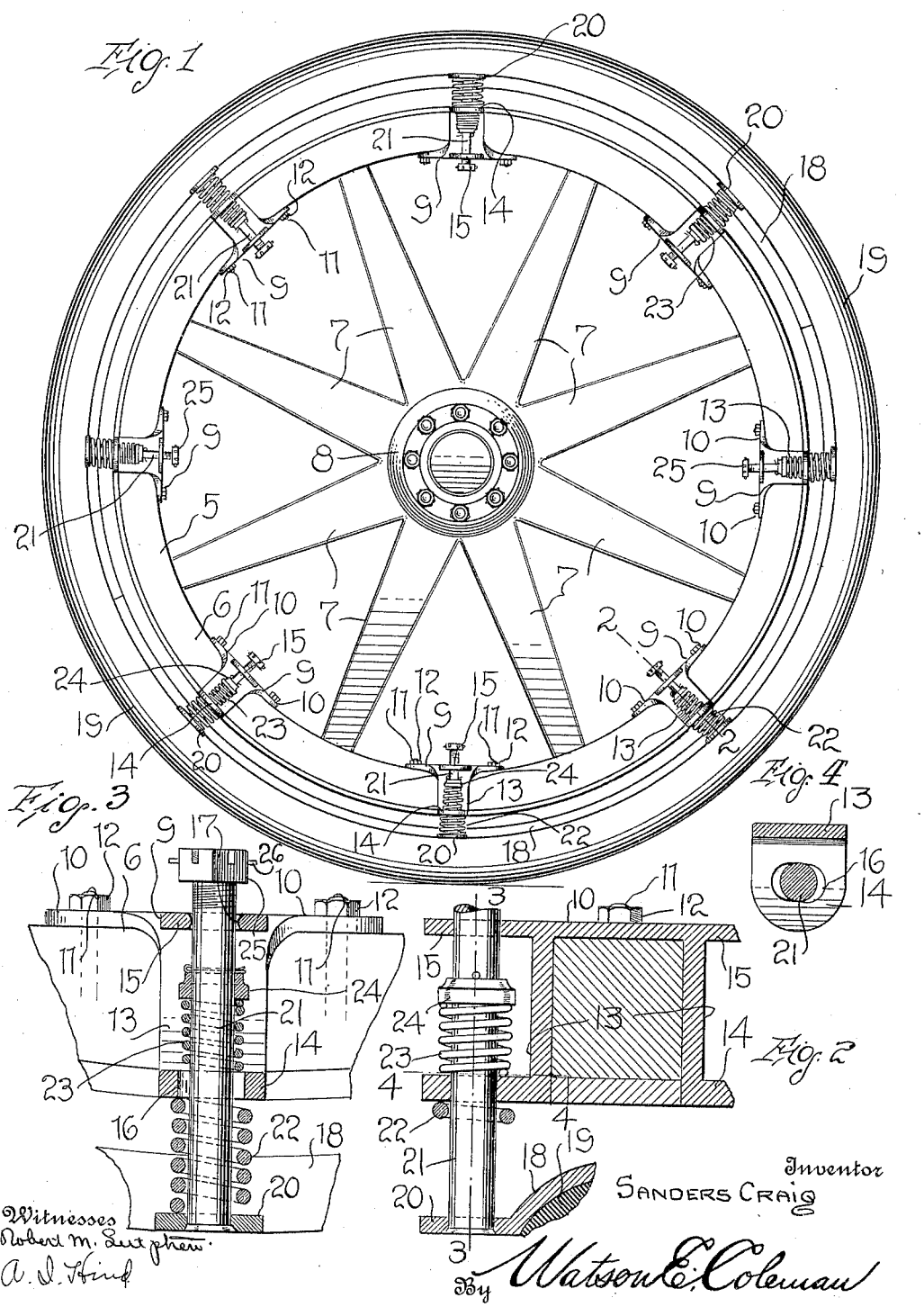
Inventor
SANDERS CRAIG

UNITED STATES PATENT OFFICE.

SANDERS CRAIG, OF EAGLE STATION, KENTUCKY.

RESILIENT WHEEL.

1,098,782.   Specification of Letters Patent.   Patented June 2, 1914.

Application filed December 6, 1913. Serial No. 805,099.

*To all whom it may concern:*

Be it known that I, SANDERS CRAIG, citizen of the United States, residing at Eagle Station, in the county of Carroll and State of Kentucky, have invented certain new and useful Improvements in Resilient Wheels, of which the following is a specification, reference being had to the accompanying drawings.

This invention relates to resilient wheels and has for its primary object to provide a yieldable support or mounting for the wheel tire which is capable of easy and quick application to the rim or felly of the wheel.

My invention has for another of its objects to provide a resilient vehicle wheel having a maximum of resiliency or shock absorbing power which admits of the use of a solid rubber tire, whereby the extra expense incident to frequent punctures sustained by pneumatic tires, is eliminated.

In its more specific aspect, the invention includes an annular rim or seat for the tire adapted to lie exteriorly of and in spaced relation to the wheel felly, bracket members secured at intervals to the wheel felly, and cushioning means carried by the annular metal rim and coöperating with said bracket members to yieldingly maintain said rim in spaced relation to the felly, said rim and wheel tire being capable of movement upon the brackets out of concentric relation to the wheel felly.

My invention has for another object to produce a device of the above character which is simple in its construction, highly efficient, reliable and durable in practical use and may be produced at small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a vehicle wheel showing the preferred embodiment of my invention applied thereto; Fig. 2 is a section taken on the line 2—2 of Fig. 1; Fig. 3 is a section taken on the line 3—3 of Fig. 2. Fig. 4 is a section taken on the line 4—4 of Fig. 2.

Referring in detail to the drawings, 5 designates the vehicle wheel having the usual felly 6 connected by the spokes 7 to the hub 8. To the wheel felly 6 between adjacent spokes, the bracket members 9 are secured. Each of these bracket members consists of a plate provided with oppositely extending apertured ears 10 to receive fastening bolts 11 which are disposed through openings in the wheel felly and have nuts 12 threaded upon their inner ends. Arms 13 are formed upon the body plate of the bracket to engage upon opposite sides of the wheel felly, and ears 14 and 15 are integrally formed with said arms at their outer and inner ends respectively. The outer ears 14 are provided with openings 16 which are elongated circumferentially of the wheel while the inner ears 15 are provided with circular openings 17.

An annular metal rim or seat member 18 of concavo convex form in cross section is adapted for arrangement over the wheel felly and is normally disposed in spaced concentric relation thereto. I have illustrated in the accompanying drawing a solid rubber tire 19 secured upon this rim, though it will be understood that by slightly changing the form of the rim, a pneumatic tire of the ordinary construction may be employed. Transversely disposed ears 20 are integrally formed upon the longitudinal edges of the rim 18 at intervals. These ears are disposed in line radially of the wheel with the ears 14 and 15 formed upon the bracket members 9. To each of the ears 20, the outer end of a rod 21 is pivotally or oscillatably connected. These rods extend loosely through the openings 16 and 17 in the bracket ears and are disposed respectively upon opposite sides of the wheel felly. Heavy coil springs 22 are arranged upon said rods between the ears 14 on the bracket and the ears 20 on the rim 18. Weaker springs 23 are also arranged upon said rods and have their outer ends secured to the ears 14, the inner ends of said latter springs bearing against the collars 24 which are secured upon the rods 21. It will thus be understood that the outer springs acting by expansive force and the inner springs by contractile force, yieldingly maintain the metal rim 18 and the tire thereon normally in concentric relation to the wheel felly. Upon the inner ends of the rods 21, nuts 25 are secured by means of suitable keys 26.

From the above description, the construction of my invention will be fully understood. Its operation in practice is substantially as follows: The device being applied to the felly of the wheel as shown in Fig. 1, the pressure of the load in the movement of the wheel is sustained by the lower portion of the tire and the cushioning springs 22 at the bottom of the wheel are compressed while the inner springs 23 expand. Upon the upper side of the wheel, the reverse of this action takes place. By the provision of the elongated slots 16 in the bracket ears 14, the rods 21 at opposite sides of the wheel are capable of movement with respect to the brackets out of their normal radial positions. In this manner, it will be seen that the springs 22 and 23 will completely absorb all shocks and jars in the travel of the vehicle over rough roads. The strength of the springs is of course determined in accordance with the carrying capacity of the vehicle and the maximum load to be transported thereby.

From the above description taken in connection with the accompanying drawing, the operation and several advantages of the invention will be fully and clearly understood. The device may be readily applied to the ordinary vehicle wheel without requiring any material alterations in its construction, and owing to its extreme simplicity it will be appreciated that the invention is highly durable as well as efficient in practical use.

It will of course be obvious that the device is susceptible of various modifications in the form, proportion and arrangement of the structural parts thereof in order to render the same applicable to various forms of wheels, and I therefore reserve the privilege of resorting to all such legitimate modifications as may be fairly embodied within the spirit and scope of the invention as claimed.

Having thus described the invention, what is claimed is:

1. The combination with the wheel proper, of spaced bracket members secured to the wheel felly and having spaced ears arranged in pairs upon opposite sides of the felly, an annular metal rim arranged over the wheel felly, a tire arranged thereon, said rim being provided at intervals upon its longitudinal edges with the transversely projecting ears, rods pivotally secured at their outer ends to said ears and extending loosely through the respective pairs of bracket ears, cushioning springs arranged between the ears on the rim and the brackets, a collar secured upon each of the rods between the bracket ears, and additional springs arranged on said rods between said collars and one of the bracket ears.

2. The combination with the wheel proper, of a plurality of bracket members secured to the wheel felly and provided with inner and outer spaced ears arranged in pairs upon opposite sides of the felly, an annular metal rim arranged over the wheel felly, a tire secured upon said rim, rods pivotally secured at their outer ends to the longitudinal edges of the rim and extending loosely through the respective pairs of bracket ears, heavy cushioning springs arranged upon the rods between the outer bracket ears and the annular rim, collars secured upon said rods, and additional comparatively light springs arranged upon the rods and secured at one of their ends to the outer bracket ears and bearing at their other ends against said collars.

3. The combination with the wheel proper, of a plurality of bracket members secured to the wheel felly and having spaced inner and outer ears arranged in pairs upon opposite sides of the felly, said inner ears being provided with circular openings, said outer ears having openings elongated circumferentially of the wheel, an annular metal rim disposed over the wheel felly, a tire arranged thereon, said rim being provided at intervals upon its longitudinal edges with transversely projecting ears, rods pivotally secured at their outer ends to said latter ears and loosely disposed through the openings in the respective pairs of bracket ears, heavy cushioning springs arranged upon said rods between the ears on the rim and the outer bracket ears, collars secured upon the rods, and comparatively light springs arranged upon the rods between the outer bracket ears and said collars.

In testimony whereof I hereunto affix my signature in the presence of two witnesses.

SANDERS CRAIG.

Witnesses:
M. CARLISLE LYDDANE,
E. L. WHITE.

---

Copies of this patent may be obtained for five cents each, by addressing the "Commissioner of Patents, Washington, D. C."